March 10, 1970   B. B. CHILDRESS   3,500,019
APPARATUS FOR DEVELOPING TEMPERATURE INDICATIVE
SIGNALS FROM STATIONARY OR ROTATING HEATERS
OR DRUMS AND FURTHER FOR DEVELOPING
CONTROL SIGNALS FROM THE TEMPERATURE
Filed Jan. 18, 1968   7 Sheets-Sheet 1
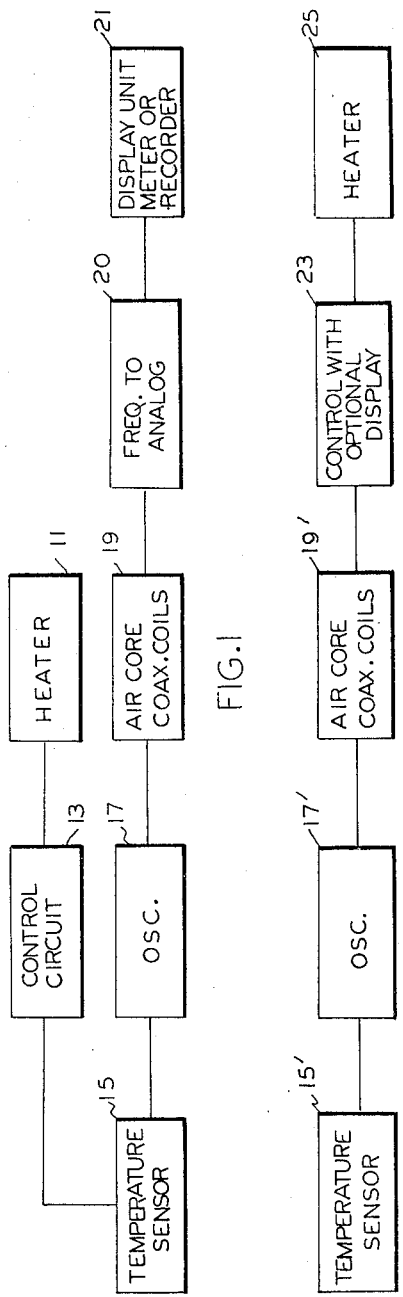
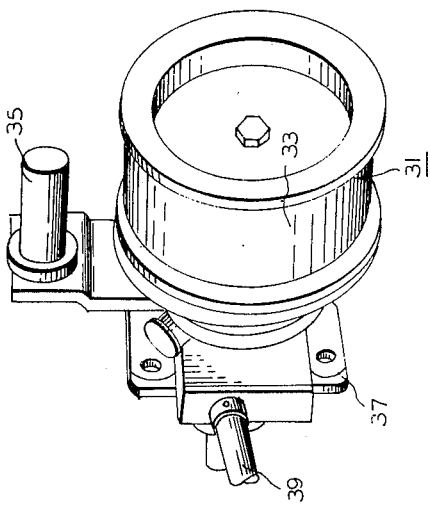
INVENTOR
BOBBY B. CHILDRESS
BY  *Wilfred D. Caldwell*
ATTORNEY

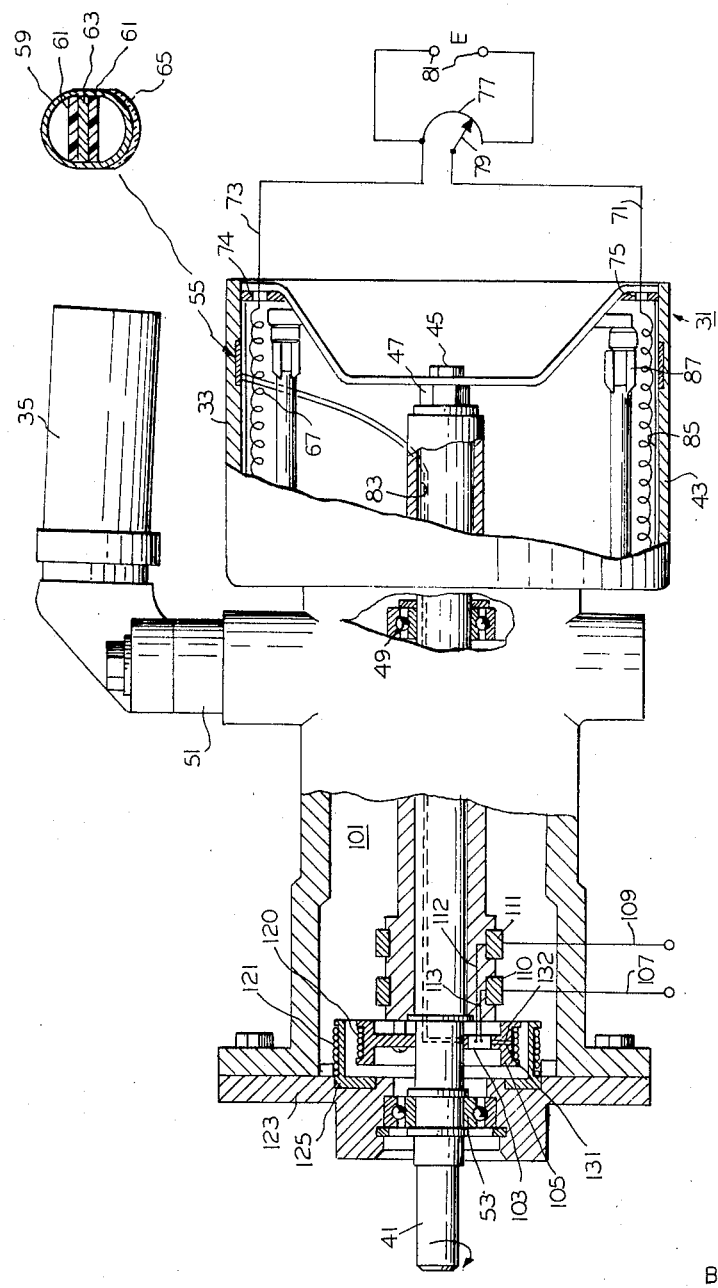

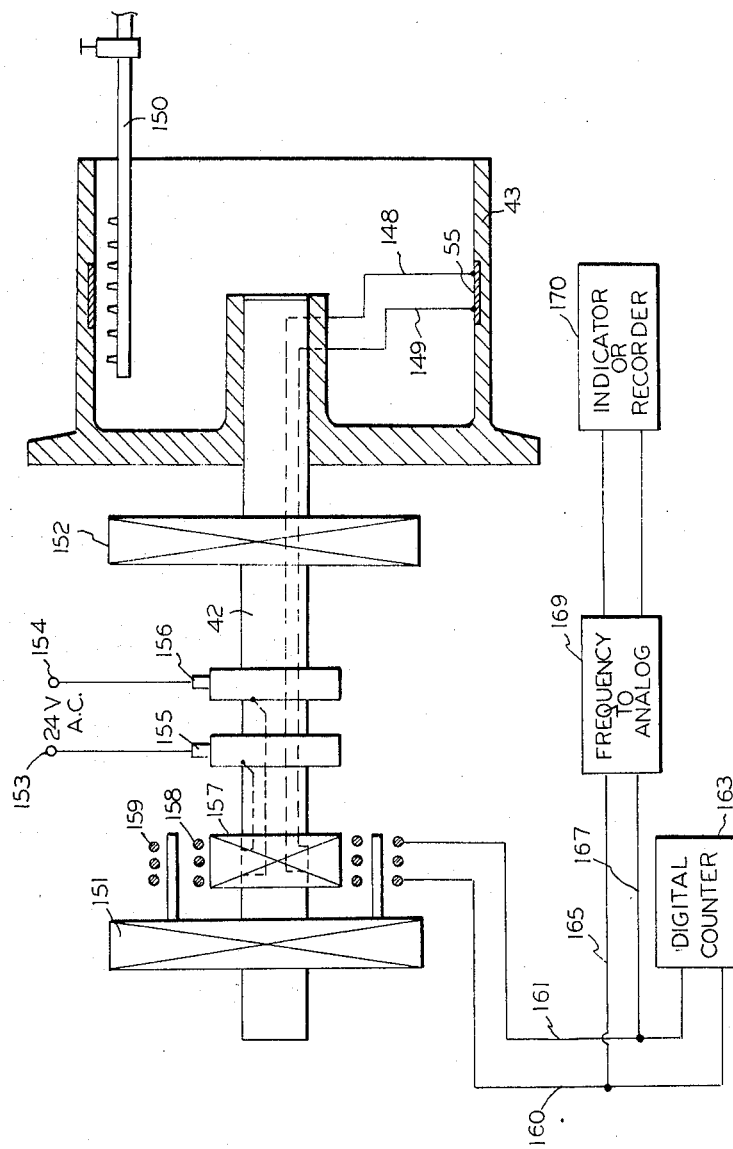

INVENTOR
BOBBY B. CHILDRESS

INVENTOR
BOBBY B. CHILDRESS

BY Wilfred G. Caldwell
ATTORNEY

March 10, 1970 B. B. CHILDRESS 3,500,019
APPARATUS FOR DEVELOPING TEMPERATURE INDICATIVE
SIGNALS FROM STATIONARY OR ROTATING HEATERS
OR DRUMS AND FURTHER FOR DEVELOPING
CONTROL SIGNALS FROM THE TEMPERATURE
Filed Jan. 18, 1968 7 Sheets-Sheet 6
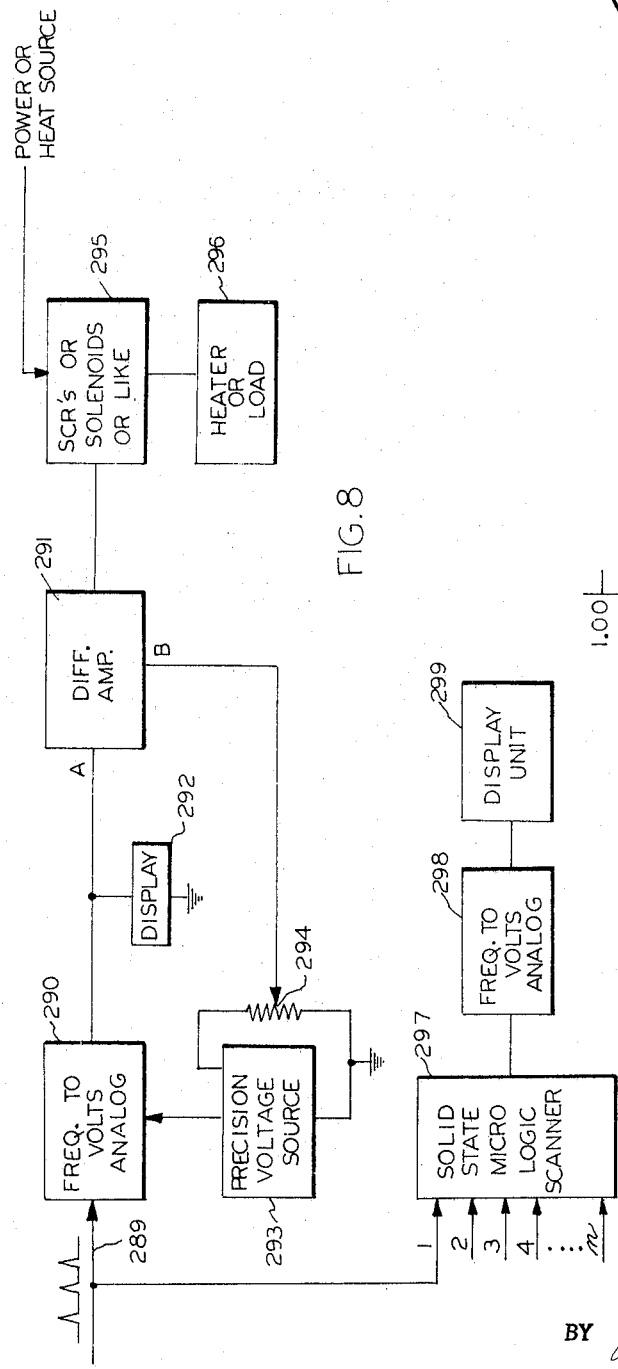
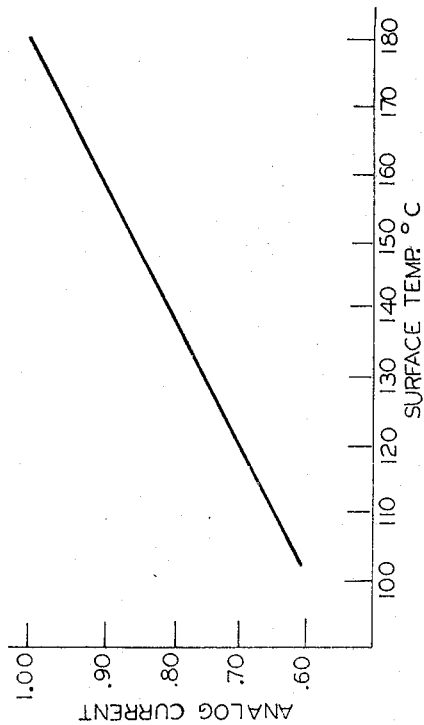
INVENTOR
BOBBY B. CHILDRESS
BY Wilfred G. Caldwell
ATTORNEY March 10, 1970     B. B. CHILDRESS     3,500,019
APPARATUS FOR DEVELOPING TEMPERATURE INDICATIVE
SIGNALS FROM STATIONARY OR ROTATING HEATERS
OR DRUMS AND FURTHER FOR DEVELOPING
CONTROL SIGNALS FROM THE TEMPERATURE
Filed Jan. 18, 1968     7 Sheets-Sheet 7
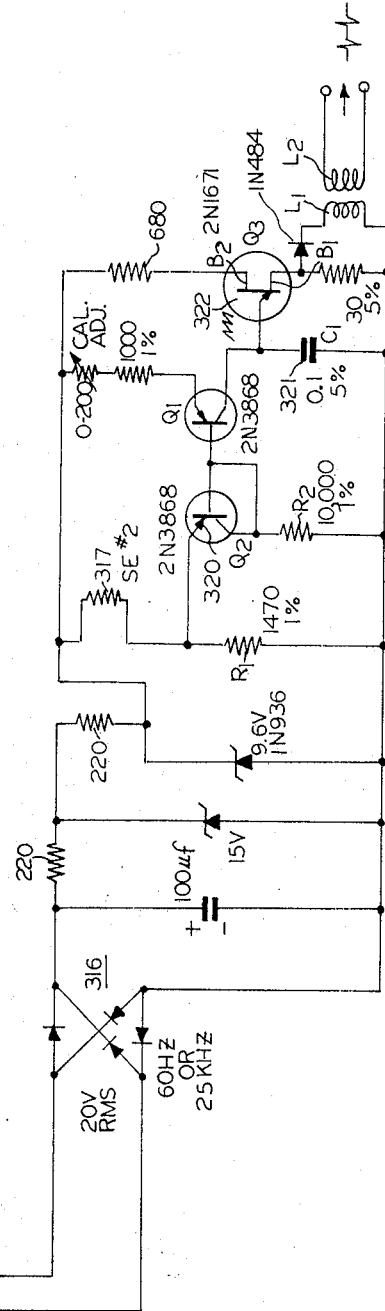
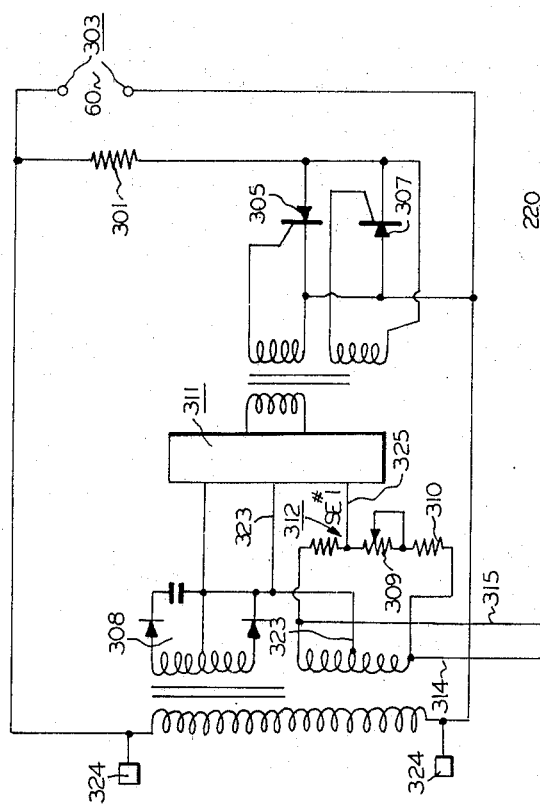
FIG. 10
INVENTOR
BOBBY B. CHILDRESS
BY *Wilfred G. Caldwell*
ATTORNEY

United States Patent Office 3,500,019
Patented Mar. 10, 1970

3,500,019
APPARATUS FOR DEVELOPING TEMPERATURE INDICATIVE SIGNALS FROM STATIONARY OR ROTATING HEATERS OR DRUMS AND FURTHER FOR DEVELOPING CONTROL SIGNALS FROM THE TEMPERATURE
Bobby B. Childress, Charlotte, N.C., assignor to Coltron Industries, Inc., Charlotte, N.C., a corporation of North Carolina
Filed Jan. 18, 1968, Ser. No. 698,784
Int. Cl. H05b *3/02*
U.S. Cl. 219—471
25 Claims

ABSTRACT OF THE DISCLOSURE

A temperature indication and control means in a drum heater in which a temperature sensor is provided to supply a signal to a control circuit which in turn supplies a signal to the heater arrangement. The temperature sensor is in circuit with an oscillator which connects the sensor output to a pulse train output proportional to the temperature of the sensor or a pulse train output frequency which is a precise analog of the sensor bulb temperature.

---

In conventional drum heaters, a temperature sensor is provided to supply a signal (or parameter change) to a control circuit which in turn supplies a signal to the heater arrangement. The present invention may modify existing systems by adding a further circuit from the temperature sensor to an oscillator which converts the sensor output to a pulse train output proportional to the temperature of the sensor or to a pulse train output frequency which is a precise analog of, for example the sensor resistance, and hence sensor bulb temperature. This pulse train may be emitted from a rotating drum, via an air core coaxial coil arrangement, to provide an accurate and useful pulse frequency analog signal.

This output signal is useful for either monitoring or control purposes. For monitoring, it may be applied to a frequency to analog converter and thence to an amp or volt meter indicator or recorder, i.e. display unit. The frequency analog signal may be used directly in novel control circuitry combination to control the heater, or it may be applied to a frequency to analog converter for voltage type control of the heater. Also, both monitoring and control may be simultaneously carried out with the foregoing systems.

In the preferred general layout of the embodiments, the temperature sensor provides a signal to the oscillator which is transferred via the air core coaxial coils to a control circuit, with optional indicator or recorder, for controlling the heater.

In the frequency control embodiment, the frequency analog signal is applied to a frequency detector, along with a fixed frequency from a group master oscillator. If one frequency is greater than the other, a power amplifier is caused to increase the heat, as by increased current to the heater, preferably on an on-off basis (or increased fuel to the heater). For the reverse condition, the current is decreased, and for equal frequencies, there is no change. The group master oscillator may be used for a great many other drums controlled by the same type circuitry.

In the voltage control embodiments, the frequency analog signal is converted to volts analog and applied to an error detector, along with a group reference analog precision voltage. The error detector output operates a power amplifier, as above, to control the heat. The group reference analog voltage is available for many other circuits controlling drums.

It is important to note that the air core coaxial coil arrangement transfers the pulse train output frequency independent of speed, regardless of whether the apparatus is rotating or stationary.

The oscillator is preferably of the relaxation variety and has an operating characteristic which compensates for the sensor, particularly when the latter is of the nickel bulb resistance type, whereby the curve of analog current to sensor or drum temperature becomes a straight line and assures that the pulse train output frequency is a precise analog of the bulb temperature. The oscillator and air core coils enable a high level output signal useful with all types of scanning including electronic switching.

While the invention is applicable in general to temperature monitoring and control, the principles are illustrated in the application of a high speed Godet for heating and softening thermoplastic yarn for draw twisting, draw winding, spin drawing and draw texturizing processes.

Particularly when rotating heaters capable of speeds in the range of 0 to 8000 r.p.m. are employed, it is especially desirable to have very accurate monitoring and control signals. Also, this permits a great number of drums, for example up to 160 or more, to be controlled from a single master station. It is for this reason that it is desirable to produce a pulse train frequency which is a precise analog of bulb temperature, regardless of the type heating, i.e., electric fuel or other fuel, or the type material being heated, speed of the device or its application.

A feature of the invention resides in the provision of a 360 degree sensor element, embedded closely to the exterior of the heated drum and preferably shielded from the heating source. This sensor supplies a parameter change to the oscillator which may be rotating or stationary, but in any event the control circuitry responsive to the pulse train output frequency may all be disposed externally from the rotating device and away from the heating source, which is highly desirable.

In the monitoring embodiment, the pulse train output frequency may be applied directly to a digital counter which provides an indication of pulses per second, or via a frequency to analog converter to a voltage or amplifier indicator or recorder (display device).

For control purposes, the pulse train frequency, as mentioned, need not be converted to a volts analog, but a frequency comparator may be employed directly to receive the pulse frequency train and also a frequency from a master station oscillator (which may be a stationary duplicate of the rotating oscillator) for a comparison to provide an output control signal applied directly to the heater control, be it stationary, or back through the rotating arrangement where the heater is rotating. The master oscillator is preferably controlled by a precision variable resistor when the sensor is a resistance bulb and it is made the exact equal so that oscillator nonlinearity of each will cancel.

With the foregoing in mind, it is among the objects of the invention to provide temperature monitoring and control of highly reliable nature, but at considerable cost savings.

It is another object to provide a temperature indicative output in the form of a pulse train output frequency which is a relatively high signal level, unaffected by contact resistance, and useful with all types of scanning, including electronic switching.

A further object is to provide such an arrangement with a 360 degree sensor for a drum, whereby average temperature may be read out.

It is also a further feature of the invention to provide an output device, particularly for rotating drums, in the form of two coaxial coils which emit the signal without distortion due to speed, and wherein the coupling is not critical and the coils are inexpensive.

Another object of this invention is to provide a method for producing suitable signals for remotely monitoring or controlling temperature.

Yet another object is the provision of direct frequency control or volts analog control.

A further object is the production of a pulse train output frequency which is a precise analog of sensed temperature.

Finally, another object of the invention is to provide a reliable signal output to a remote monitoring or control apparatus so that radiated or conducted heat from the heater drum or plate poses no problems.

With the foregoing in mind, other and further objects of the invention will be apparent to one skilled in the art from a reading of the following detailed description when taken in light of the accompanying drawings, wherein:

FIGURE 1 is a block diagram of the invention for monitoring or recording temperature.

FIGURE 2 is a block diagram of the invention for controlling the heater with or without monitoring.

FIGURE 3 is a view in perspective of a Godet heater with spaced separator roll for use in the present invention.

FIGURE 4 is a view in cross section of a Godet or heated drum and associated components in accordance with the present invention.

FIGURE 5 is a schematic arrangement of a monitoring arrangement incorporating a heater.

FIGURE 8 shows a substitute similar control in block diagram for the control of FIGURE 7.

FIGURE 9 is a chart to illustrate linearity between analog current and surface temperature.

FIGURE 10 is an electrical diagram showing circuit arrangements preferred for selected circuits of the invention.

Figure 6:
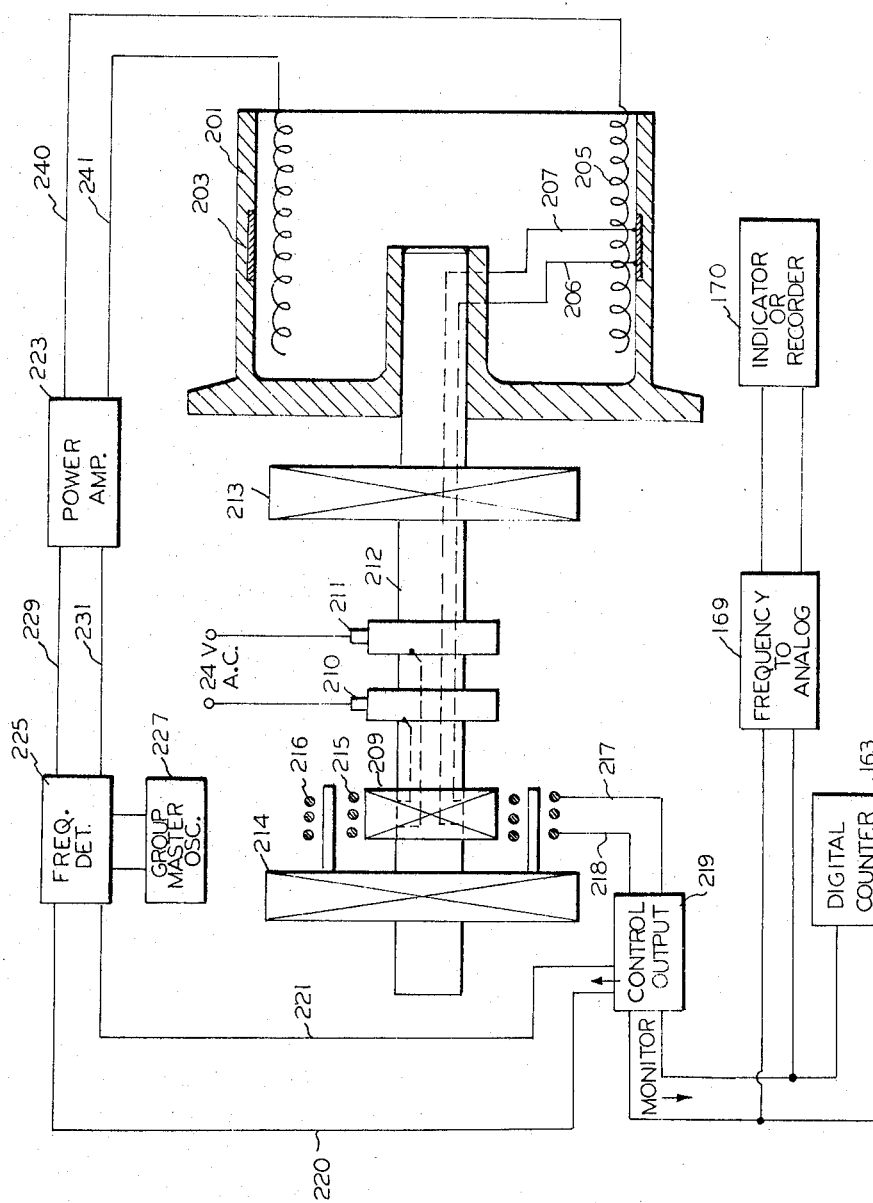
FIGURE 6 is a similar schematic arrangement incorporating either or both of monitoring and control.

Referring now to the drawings, there is shown in FIGURE 1 a heater 11 operating under control of a control circuit 13, in turn responsive to a temperature sensor 15, to illustrate the arrangements generally employed in the prior art. There is also shown an oscillator 17, which may be a stationary or rotating relaxation type, connected to the temperature sensor to supply air core coaxial coils, shown in block form at 19, in turn supplying a display unit 21 (meter or recorder) via a frequency to analog converter 20 for monitoring purposes.

In this arrangement, the oscillator 17 preferably serves as a sensor resistance to pulse frequency analog converter, and the air coils 19 deliver this signal without distortion regardless of any rotation speed to frequency to analog converter 20 for display at 21.

Particularly, where temperature sensor 15 is a nickel bulb element, and the oscillator 17 is of the type depicted in FIGURE 8, the pulse train output frequency applied to coils 19 is a precise analog of bulb resistance and hence bulb temperature, as will further be explained hereinafter.

In FIGURE 2, a temperature sensor 15' supplies oscillator 17', in turn connected to air core coils 19', which may deliver the pulse train output frequency to external control circuit 23, with optional meter or recorder, in turn controlling heater 25. It may be noted at this point that the air core coaxial coils 19' may replace a transformer with a cost savings of $18 or $19, while further yielding the advantages herein indicated, i.e. independent of speed, low cost, lightweight and readily fabricatible. Also oscillator 17' may be constructed inexpensively for a parts cost of $3 to $6 as a printed circuit board.

In FIGURE 3, there is shown a heated drum or Godet 31 having a smooth exterior surface 33 for the synthetic yarn or the like and a separator roll 35 for accommodating multi-turns. A mounting frame 37 is provided for the Godet and a multiconnection 39 provides for power input and signal output.

In FIGURE 4, there is shown a cross section of a Godet similar to Godet 31, in which it may be seen that tapered shaft 41 is provided for imparting 0 or up to high speeds to the Godet drum 43, which is preferably made from a steel casting, forging, or solid billet, and is suitably secured to shaft 11 by screw 45 and jam nut 47. Roller bearings 49 are provided to permit shaft 41 to rotate the drum 43 relative to the supporting structure 51 and separator roll 35. Also, rear bearing 53 is provided to establish a two point support for shaft 41.

The sensor element is shown at 55 in the form of a 360 degree band, of course slightly separated at its ends, but embedded near the outer peripheral surface 33 of the drum 43 to sense its temperature.

The sensor preferably comprises the structure shown enlarged in the inset to FIGURE 4, which includes a metal outer sheath 59, upper and lower mica layers 61 and the nickel resistance wire 63, all in the form of bands. The inner side of shield 59 is protected by a layer of Fiberglas 65 which serves to "shade" the heat from the electrical resistance heater 67 from the resistance wire 63, and thus render the nickel element more sensitive to the drum surface temperature. It is pointed out that other heat sensing elements can be used, such as peripherally spaced apart thermistors and the like, but the advantages are not as great as with the 360 degree nickel resistance wire sensor.

In this embodiment, the electrical resistance heater is shown to be stationary relative to the drum and the leads 71 and 73 pass through annular openings 74 and 75 to a potentiometer 77, which has a movable selecting arm to select any portion of the voltage applied at input terminals 81. Obviously, a rotating electrical heater or other source of heat may be employed, and where leads are necessary, they are brought through axial passage 83 to slip rings or the like.

The inner portion of the heater 31 is lined with asbestos tape 85 and a conventional wedge and clamp 87 is provided for securing the described structure.

A large compartment 101 is provided, along tapered shaft 41 for containing components, if desired. However, it is preferable to locate these components externally of the Godet to avoid any reflected or radiated heat, but there is some advantage to disposing the components opposite the closed end of drum 43, to reduce heat problems.

An oscillator 103 is carried by a non-metal insulating micarta coil form 105, and the oscillator is preferably of the type herein discussed and described in detail in FIGURE 8, being assembled in printed circuit or printed board form. The oscillator 103 is supplied with input power by leads 107 and 109 which are connected to slip rings 110 and 111, in turn extended to the oscillator by leads 112 and 113.

The coaxial air core coils are shown as the inner rotating coil 120 and the outer stationary coil 121, the latter being supported by frame member 123 and its insulating winding support 125. Electrical leads 131 and 132 connect the oscillator 103 to the moving coil 120.

In FIGURE 5, there is illustrated a schematic arrangement similar to the structure of FIGURE 4, but including output utilization of the signal. The drum 43 includes the same or equivalent type sensor element 55 and a stationary fuel actuated heating arrangement 150. A pair of bearings 151 and 152 are provided for tapered shaft 41 and input power is provided between leads 153 and 154 to slip rings 155 and 156. These slip rings supply energy to oscillator 157 (now shown as an annular printed circuit) which in turn supplies the signal to rotating coil 158, which transfers the pulse train to stationary coil 159. Sensor leads 148 and 149 extend to oscillator 157. The output leads 160 and 161 from coil 159 extend to digital counter 163 to provide a measure of pulses per second. A branch circuit includes leads 165 and 167 to a frequency to analog converter 169 which supplies the display device, either the volt or amp indicator or recorder 170.

In FIGURE 6, a schematic arrangement is included, further to show suitable control circuitry. The drum 201 includes sensor element 203 and electrical heater 205. Sensor leads 206 and 207 extend to oscillator 209, supplied with input power via slip rings 210 and 211, shaft 212 being journalled in bearings 213 and 214. Inner coil 215 transfers the signal to stationary coil 216 with output leads 217 and 218 extending to block 219, which may comprise through connections to both outgoing paths or may be a time sharing switch. The signal following the lower path extends to digital counter 163, as in FIGURE 5 and, also to frequency to analog converter 169 and indicator or recorder 170. The vertical extending leads 220 and 221 extend to frequency detector 225, which is supplied a reference frequency from group master oscillator 227. Output leads 229 and 231 lead to power amplifier 233 which may operate SCR's or relays to increase the firing angle or turn on or off the heating current through leads 240 and 241. Thus, if the frequency entering frequency detector 225 is, for example, greater than the group master oscillator frequency, heating current may be turned on and for the reverse comparison, the heat may be turned off. Any number of such units may be operated from the group master oscillator frequency for individual control of the same type circuitry, merely repeated.

Figure 7:
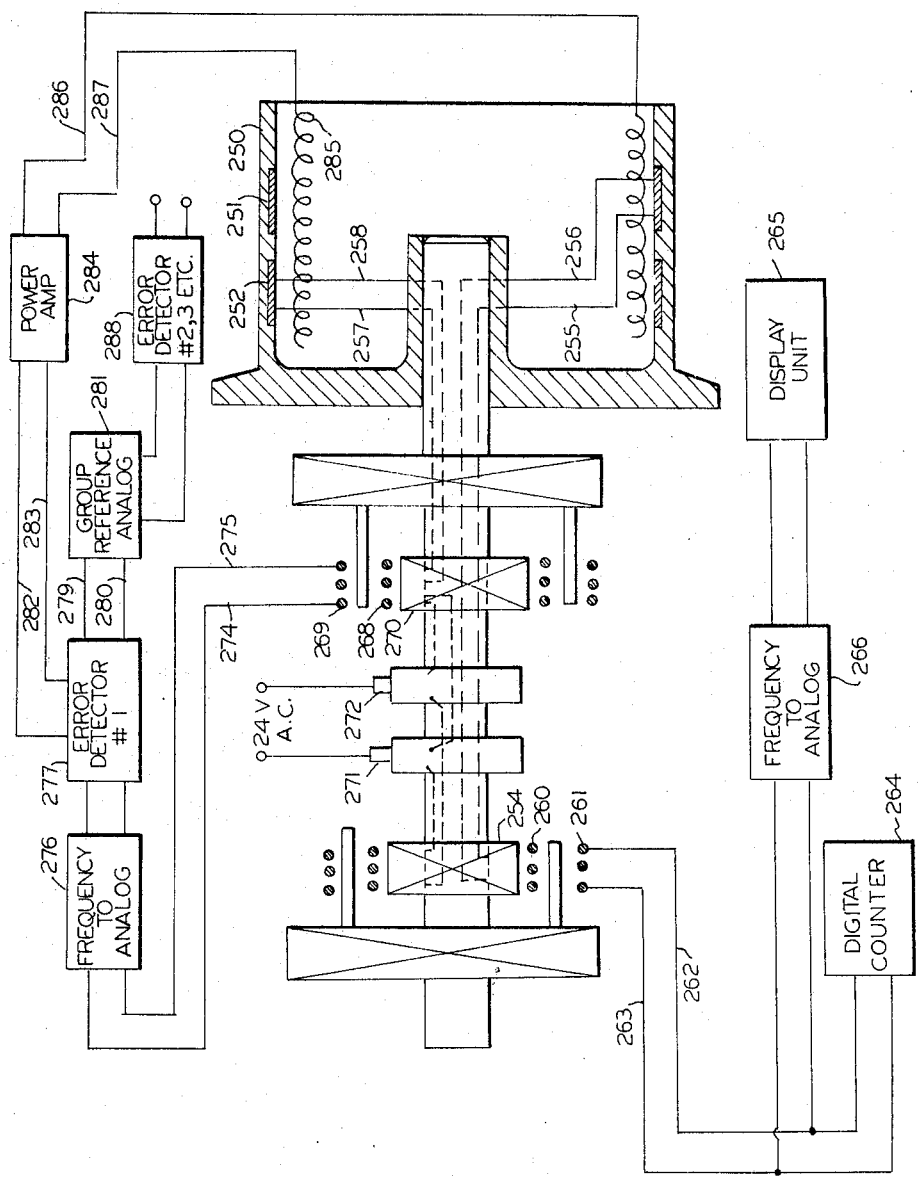
FIGURE 7 is a schematic arrangement for monitoring and for control by volts analog.

In FIGURE 7, there is shown a dual monitoring and control schematic arrangement wherein the drum 250 includes a pair of sensors 251 and 252, sensor 251 providing the input for oscillator 254 via leads 255 and 256 and sensor 252 providing the control feature over leads 257 and 258.

The monitoring arrangement is, as previously described, with oscillator 254 supplying moving coil 260, in turn exciting stationary coil 261 for output monitoring over leads 262 and 263 to digital counter 264 and display unit 265 via frequency to analog converter 266.

A second pair of output coils comprising moving coil 268 and stationary coil 269 is provided for the control function via second oscillator 270.

Both oscillators are supplied with input power via slip rings 271 and 272. However, it should be pointed out that a further pair of rotating coaxial air coils could be substituted for slip rings 271 and 272, so that in all, three sets of the coils would be employed without slip rings, the third set being supplied via VLF radio (25 kHz.).

The output control is taken from coil 269 over leads 274 and 275 to a frequency to analog converter 276 which provides a voltage analog signal to error detector 277. Error detector 277 may comprise a voltage or current bridge and one such detector is provided for each Godet or drum. It is also supplied a precision fixed voltage via leads 279 and 280 from group reference analog 281 for voltage comparison at error detector 277. The output via error detector 277 is sent over leads 282 and 283 to power amplifier 284, which in turn controls heater 285 over leads 286 and 287 as hereinbefore explained, to maintain, reduce or increase the heat to heater 285 in accordance with the temperature control derived from sensor 252. Each drum, such as 250, is associated with its own frequency to analog converter and error detector, such as 288, shown for number 2, number 3, etc. in order that the group reference analog source of precision voltage 281 may be employed in a master sense.

In FIGURE 8, there is shown a further voltage control arrangement with monitoring, which will accommodate group situations. It should be pointed out that since the temperature frequency information is in the form of an analog frequency signal, it can be used in these closed loop approaches to considerable advantage. The analog frequency signal is applied over lead 289 to a frequency to volts analog converter 290 and thence to difference amplifier 291, as signal A. An individual display unit 292 may indicate or record the temperature, if desired.

A precision voltage source 293 is provided for comparison purposes and its signal or level is indicated as signal B, derived from level adjusting potentiometer 294.

The voltage source 293 is shared with the analog determining circuit 290 so that voltage stability errors are eliminated. The difference amplifier 291 output may be zero when A equals B. Correspondingly, it may be + (plus) when B is greater than A and positive voltage turns on the SCR's of block 295 or operates the solenoid means. As the temperature increases the voltage level at A will follow. When signal level A is greater than B, the differential output will shut off the power at 295 which supplies heater 296.

Since the frequency analog is unaffected by contact of set and the like, i.e., it is not voltage dependent, the solid state micro logic scanner 297 may receive input from each of N circuits to provide group monitoring via frequency to volts analog 298. A common display unit 299 will monitor information for the group, or a digital counter 300 may monitor and display each Godet of the group in sequence.

In FIGURE 9, there is shown the linear relationship between analog current and bulb temperature, at the drum, occasioned by the circuits of this invention, and it is this precise analog of bulb resistance and hence bulb temperature that the output signal develops, to lend useful significance to this approach.

In FIGURE 10, there is shown the oscillator to sensing element connections for developing the precise pulse frequency output train, wherein the repetition rate of the oscillator is controlled by the resistance of the nickel element 317. First, however, the heater 301 is supplied with AC input power from, e.g. 60 cycle, 115 volt source 303 under control of SCR's 305 and 307, in turn operated by a conventional on-off type control 311. Control 311 may also be of the type of FIGURES 6, 7 or 8. The control sensor element is shown at 312 and its output signal or parameter change is taken over leads 325 and 323, and applied to the error input terminals of controller 311. In this case, the controller, heater and oscillator rotate. 115 volts 60 Hz. is supplied to all through slip rings 324. Sensing element #2, shown at 317, is included for monitoring. 20 volts r.m.s. is applied to bridge 316 in FIGURE 10.

Generally, the resistance change of sensor bulb 317 causes the voltage at Q2 emitter 320 to shift negative in proportion to the resistance change. Q1 is a constant current type generator and this constant current charges C1, shown as capacitor 321, at a constant rate. Therefore, the time varying voltage at capacitor 321 or the Q3 emitter is quite linear with time.

Q2 is preferably a transistor of the same type as Q1 and its base to emitter voltage varies at the same rate as Q1. These transistors track within 30 μv. per degree centigrade. The ratio of $R_1$ to $R_2$ is chosen to obtain nearly equal emitter currents at the center of the ambient temperature range, and C1 is a temperature stable poly carbonate film capacitor with negligible drift to 65° C.

Q3 is a unijunction transistor and is extremely stable as a level sensing device to produce a high level output pulse when the emitter voltage exceeds this constant level. C1 is discharged via a negative resistance emitter to its lower base path to precise valley voltage where the emitter base junction reverts to a reverse biased diode. C1 recharges linearly to the precise peak point voltage and the cycle repeats with the result being the pulse train output at Q3 base whose frequency is a precise analog of the bulb resistance and hence the bulb or Godet temperature. The air core coaxial coils L1 and L2 have a 1 to 2 turns ratio of number 32 wire with L2 preferably having 50 turns and being the stationary coil.

In FIGURE 10, when the resistance of bulb 312 is equal to the resistance of temperature pre-setting resistor 309 and fixed resistor 310 in the Wheatstone bridge, the signal to control 311 is zero and out of phase. Otherwise positive and negative signals increase and decrease heat at heater 301. The upper secondary circuit 308 is used to supply B+ for control circuit 309.

The L2 output pulse train may be utilized, for example, to trigger a monostable multivibrator to produce a constant amplitude constant width rectangular output pulse for each trigger. The result is a DC output voltage which may appear on a conventional indicator or recorder and may be calibrated to read in centigrade or Fahrenheit degrees.

The non-linearity of the nickel bulb tends to compensate for the non-linearity of the circuit, resulting in the linear output. Nickel is non-linear from about 0 to 380° C. If a platinum bulb is substituted, it must be compensated for electrical non-linearity, and if a thermistor replaces the sensing resistor, the sense of the circuit will be reversed and while the sensitivity is increased, the calibration would be less linear.

A silicon diode added between Q3B1 and L1 provides 0.4 to 0.6 volt isolation between stray pickup to L1 and the potential at Q3B1. This minimizes pick up volts which might incorrectly modulate the C1 voltage and cause erroneous frequency modulation.

Thus, it may be seen that various substitutions and combinations of the components herein may be made without departing from the principles taught. So long as the frequency pulse train analog signal is made available, the monitoring and control can be in accordance with any of the embodiments disclosed, useful with conventional controls or employed in various combinations herein depicted. Accordingly, it is intended that the invention be limited only by the claims appended hereto.

What is claimed is:

1. Temperature responsive and control apparatus for heating traveling synthetic yarn and the like comprising in combination frame support means, shaft means mounted for rotation relative to the frame support means, a hollow drum rotatably carried by the shaft means and having a cylindrical peripheral surface for turns of the yarn, heating means for heating the drum and its peripheral surface, temperature sensing means carried by the drum and disposed adjacent said peripheral surface, oscillator means carried by the shaft for rotation therewith, leads connecting the temperature sensing means into the oscillator means whereby the temperature sensed by the sensing means is converted into a pulse train in which the frequency is the analog of the temperature, means for supplying power from an external source to the oscillator means, output means comprising at least a pair of coaxially disposed air core coils, one of the coils being mounted on the shaft for rotation therewith and supplied with the pulse train from the oscillator means, the other of said coils being carried by the frame support means, output terminals from the other of said coils, and utilization means connected to the output terminals for receiving the pulse train frequency analog.

2. The apparatus of claim 1 wherein the temperature responsive means comprises a substantially 360 degree wire resistance band imbedded in the drum, insulating bands adjacent the inner and outer surfaces of said resistance band, and a metal sheath enclosing said bands.

3. The apparatus of claim 2 wherein the heater means comprise electrical heater wire within the drum adjacent the inner surface of the hollow drum, and a layer of Fiberglas tape disposed between the sheath and the electrical wire.

4. The apparatus of claim 1 wherein the temperature sensing means comprises a pair of sensing elements and the output means comprises two pairs of respectively coaxially disposed air core coils, said utilization means comprise display means, and wherein the oscillator means comprises second oscillator means connected to the other of said pair of sensing elements to produce a pulse train frequency analog of temperature sensed by the other of said sensing elements, means connecting the means for supplying power from an external source to the second oscillator means, means connecting the output from the second oscillator means to a rotating coil of said second pair carried by the shaft means, the other coil of said second pair being carried by the frame means, output terminals for the other coil of said second pair, and control means connected between said last-mentioned output terminals and the heating means for controlling the heat supplied to the drum.

5. The apparatus of claim 4 wherein the control means comprises a frequency to analog converter for converting the frequency analog pulse train to a volts analog signal, error detecting means for receiving said signal, reference analog means for supplying a precision reference voltage to the error detecting means, and power amplifier means responsive to any output from the error detecting means for controlling the heat supplied by the heating means.

6. The apparatus of claim 5 comprising a plurality of the identical apparatus without repetition of said reference analog means, and connections from said reference analog means to the error detecting means for each of said plurality.

7. The apparatus of claim 1 wherein said utilization means comprises frequency to analog converter means, and at least one of indicator or recorder means connected to receive the output from the frequency to analog converter means.

8. The apparatus of claim 7 wherein said utilization means further comprises frequency detector means responsive to the pulse train frequency analog output, another oscillator means for supplying a fixed frequency to the frequency detector means and power amplifier means responsive to the frequency detector means to control the heating means.

9. The apparatus of claim 8 comprising a plurality of the identical apparatus without repetition of said another oscillator means for supplying a fixed frequency, and connections from said another oscillator means to the frequency detector means for each of said plurality.

10. The apparatus of claim 1 wherein said utilization means comprises frequency to volts analog converter means, differential amplifier means connected to receive the output of the frequency to volts converter means, precision voltage source means connected between the differential amplifier means and the frequency to volts converter means, heat control means responsive to the output of the differential amplifier means for controlling the heating means.

11. The apparatus of claim 10 wherein the utilization means further comprises solid state micro logic scanner means responsive to the pulse train frequency analog for scanning a plurality of said pulse train frequency analogs from a plurality of identical apparatus, frequency to volts analog converter means responsive to each solid state logic scanner means, and display means responsive to each frequency to volts analog converter means.

12. Temperature responsive apparatus comprising in combination, heater means, means having an outside surface for engaging material to be heated and heated by the heater means, oscillator means for producing a pulse train, temperature sensing means responsive to temperature in accordance with the outside surface for modifying the frequency of the oscillator pulse train pursuant to changes in outside surface temperature, a first air core coil for receiving the oscillator pulse train, a second air core coil in coaxial relation to the first air core coil for receiving the pulse train by induction, and terminal means for the second coil whereat the pulse train is available for temperature monitoring and control.

13. The combination of claim 12 further comprising means for rotating the means having an outside surface and one of said coils.

14. The combination of claim 13 wherein the temperature sensing means comprises an annular resistance band imbedded in the outside surface.

15. The combination of claim 14 wherein the annular resistance band is nickel wire and the oscillator exhibits a characteristic substantially compensating for nickel nonlinear resistance temperature change.

16. The combination of claim 12 further comprising means for controlling the heater means in response to the temperature sensing means.

17. The combination of claim 16 further comprising frequency to analog conversion means responsive to the pulse train at the output terminals, and display means responsive to the frequency to analog conversion means.

18. The combination of claim 16 further comprising digital counter means responsive to the pulse train at the output terminals.

19. The combination of claim 12 further comprising frequency responsive control means directly responsive to the pulse train at the output terminals for controlling the heater means.

20. The combination of claim 12 further comprising frequency to volts analog means responsive to the pulse train at the output terminals, and voltage responsive control means responsive to the frequency to volts analog means for controlling the heater means.

21. The apparatus of claim 12 further comprising frequency control means including frequency detector means responsive to the pulse train, another oscillator means for developing a fixed frequency output for application to the frequency detector means to produce an output differential frequency, and power amplifier means responsive to the output differential frequency to control the heater means.

22. The apparatus of claim 12 comprising a plurality of identical apparatus with the exception of said another oscillator means, and connections from the frequency detector means of each of said plurality of apparatus to said another oscillator means for group control.

23. The apparatus of claim 12 further comprising second temperature sensing means spaced from the first-mentioned temperature sensing means for sensing temperature in accordance with the outside surface, second oscillator means having a pulse train frequency output in accordance with the temperature sensed by the second sensing means, frequency to analog volts converter means connected to receive the pulse train frequency output from the second oscillator means, error detector means connected to receive the output of the frequency to analog volts converter means, reference volts analog means connected to supply a precision voltage level to the error detector means and means responsive to the output of the error detector means to control the heater means by maintaining preset heat when said output is zero and by increasing or decreasing heat when said output is electrically above or below zero.

24. The apparatus of claim 12 further comprising frequency to volts analog means responsive to said pulse train, differential amplifier means responsive to the frequency to volts analog means, precision voltage source means connected between the frequency to volts analog means and the differential amplifier means to provide a temperature control output from the differential amplifier means, and heat control means responsive to the differential amplifier means to control the heater means in accordance with the setting of said voltage source means.

25. The apparatus of claim 12 wherein said oscillator means comprises first semiconductor means responsive to the parameter change of the temperature sensor, second semiconductor means responsive to the first semiconductor means and connected as a constant current generator, capacitor means connected to receive charge from the constant current generator, unijunction transistor means connected to discharge the capacitor means via a negative resistance connected emitter to valley voltage, and leads to the first air core coil from the capacitor means via the negative resistance emitter to produce said pulse train in said first coil.

References Cited

UNITED STATES PATENTS

| | | | |
|---|---|---|---|
| 3,412,229 | 11/1968 | Seagrave | 219—471 |
| 3,435,171 | 3/1969 | Lohest | 219—471 |

BERNARD A. GILHEANY, Primary Examiner

F. E. BELL, Assistant Examiner

U.S. Cl. X.R.

219—494, 507